United States Patent [19]

Hollands et al.

[11] 4,078,544

[45] Mar. 14, 1978

[54] CORRUGATED COVER PLATE FOR FLAT PLATE COLLECTOR

[75] Inventors: K. G. Terry Hollands, Elora; Bruce Sibbitt, Waterloo, both of Canada

[73] Assignee: The United States of America as represented by the United States Department of Energy, Washington, D.C.

[21] Appl. No.: 680,605

[22] Filed: Apr. 26, 1976

[51] Int. Cl.² ............................................. F24J 3/02
[52] U.S. Cl. .................................... 126/270; 126/271; 237/1 A
[58] Field of Search .............. 126/270, 271; 237/1 A; 165/96, 100, 102, 135; 350/288, 299

[56] References Cited

U.S. PATENT DOCUMENTS 4,019,496   4/1977   Cummings ........................... 126/271

Primary Examiner—Kenneth W. Sprague
Assistant Examiner—Larry Jones
Attorney, Agent, or Firm—Dean E. Carlson; Frank H. Jackson; Paul A. Gottlieb

[57] ABSTRACT

A flat plate radiant energy collector is providing having a transparent cover. The cover has a V-corrugated shape which reduces the amount of energy reflected by the cover away from the flat plate absorber of the collector.

2 Claims, 2 Drawing Figures

CORRUGATED COVER PLATE FOR FLAT PLATE COLLECTOR

CONTRACTUAL ORIGIN OF THE INVENTION

The invention described herein was made in the course of, or under a contract with the UNITED STATES ENERGY RESEARCH AND DEVELOPMENT ADMINISTRATION.

BACKGROUND OF THE INVENTION

The flat plate radiant energy collector is comprised of a flat energy absorber covered by one or more transparent cover plates, all contained within and enclosed by a housing. Radiant energy is transmitted through the transparent cover plates and absorbed by the energy absorber. The cover plates reduce heat loss from the energy absorber because they tend to be opaque to infrared radiation from the plates and because they retard convective heat transfer from the absorber. Means are provided for removing and/or utilizing the energy absorbed by the plate energy absorber. The problem associated with the cover plate is that a certain amount of radiant energy incident on the transparent cover plate is reflected away from the absorber and not transmitted through the plate to the absorber. The most common prior art technique for reducing reflection has been to coat the surface of the cover plate with an anti-reflective coating. The coating, of course, increases the cost of the plate.

It is therefore an object of this invention to provide an improved radiant energy collection device.

Another object of this invention is to provide an improved flat plate radiant energy collector.

Another object of this invention is to provide an improved flat plate radiant energy collector with reduced reflection loss from the cover plate.

SUMMARY OF THE INVENTION

A flat plate radiant energy collector which includes a flat energy absorber is provided with a V-corrugated cover plate maintained in a spaced relationship from the surface of the absorber by a housing. The air gap between the plate and the absorber reduces convective heat loss from the absorber. The V-corrugated shaped of the cover plate reduces reflected energy loss. One or more such cover plates may be included in the housing and such plates may be constructed of cheap plastic, thereby not greatly increasing the cost of the device over the standard flat cover plate.

DETAILED DESCRIPTION OF THE PREFERRED EMBODIMENT

Figure 1:
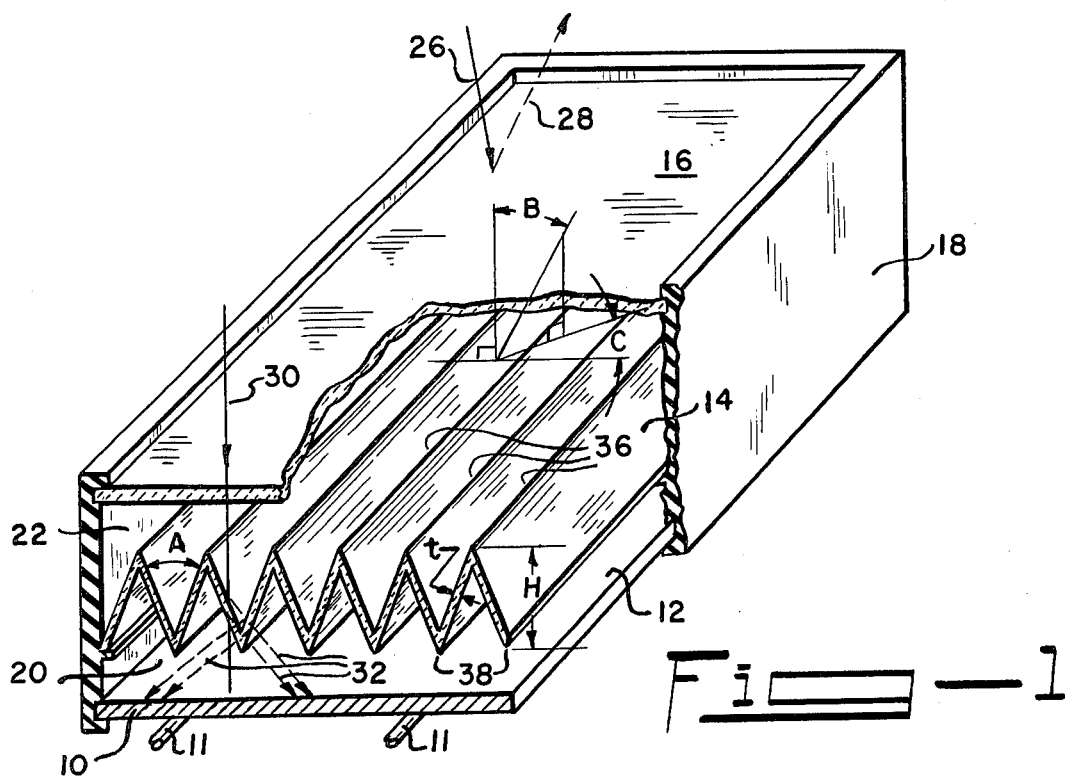
FIG. 1 shows an improved flat plate solar collector.

Referring to FIG. 1 there is shown an improved flat plate collector. A flat plate collector normally includes a flat energy receiver 10 or absorber which is a device having a generally planar configuration and which absorbs radiant energy incident on the top surface 12 thereof. For example, such a device might be a black plate with coolant flowing underneath or through the plate to remove the heat absorbed by the plate such as by pipes 11, or might be an array of photovoltaic cells. Plate 10 is generally covered by one or more transparent cover plates, such as cover plates 14 and 16. The cover plates 14 and 16 permit sunlight to be transmitted through themselves to surface 12 where the sunlight is absorbed. The purpose of the transparent covers 14 and 16 is to reduce heat loss from surface 12. The assembly of absorber plate 10 and cover plates 14 and 16 is held in the desired respective positions and is enclosed by housing 18. Housing 18 maintains an air gap 20 between cover plate 14 and surface 12, and an air gap 22 between cover plate 14 and cover plate 16, and normally it is of an insulating material to reduce covective heat loss from surface 12. These air gaps 20 and 22 retard convective heat loss from the surface 12 of absorber 10. Depending upon the material comprising cover plates 14 and 16, cover plates 14 and 16 may be opaque to infrared radiation from plate 10 thereby further reducing the heat loss from absorber 10.

FIG. 1 shows two cover plates, however, one cover plate or more than two cover plates may be utilized. The more cover plates, the more air gaps and thus the greater reduction in convective heat loss, but also the greater the cost of the assembly. Prior art cover plates are flat, such as plate 16. Associated with a flat cover plate, however, is that a certain amount of the radiant energy incident thereon, such as ray 26, is reflected off rather than transmitted through the cover plate, such as along path 28, due to the boundary conditions of the different index of refraction between the cover plate and the surrounding atmosphere. This reflective loss reduces the amount of energy incident on absorber surface 12 and thus reduces the efficiency of a flat plate collector.

In FIG. 1, there is shown a cover plate 14 with less reflective loss than a flat cover plat, such as plate 16. Plate 14 has a corrugated shape, that is, it consists of a series of adjacent V-shaped sections. For the V-corrugated cover plate 14, rays such as ray 30 which are partially reflected when incident on plate 14, such as along paths 32, are reflected towards surface 12 and therefore are not lost. Thus, the V-corrugated cover plate has a higher transmittance of incident radiant energy than the flat cover plate 16.

Figure 2:
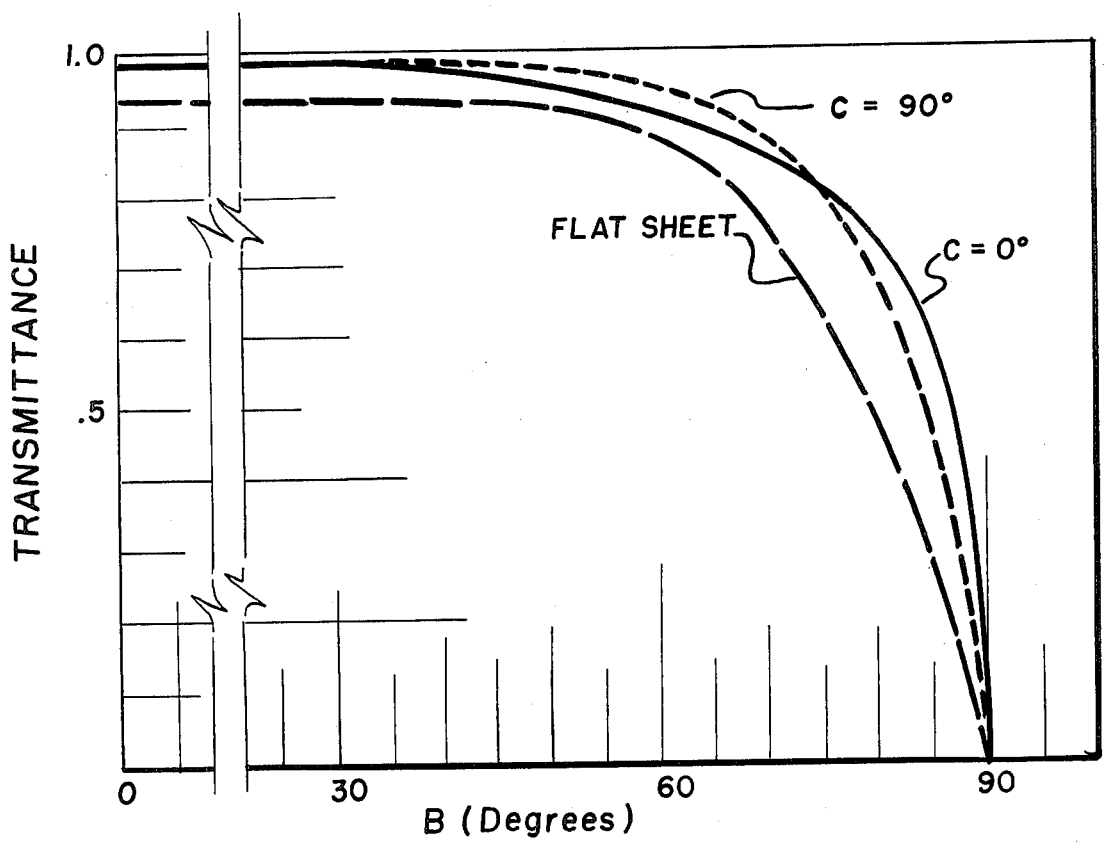
FIG. 2 is a set of curves showing the performance of the improved collector.

The overall transmittance of the V-shaped cover plate depends on only two parameters, the index of refraction of the material forming the V-shaped plate 14, $n$, and the product of the extinction coefficient of the material, $k$, which is a measure of the attenuation of the incident rays as they pass through the material, and the thickness, $t$, of the cover plate, i.e. $kt$. As an order of magnitude, the index of refraction of glass and most plastics is approximately 1.5, giving a reflectance for normal incidence of approximately 4% at an interface with air. Clearly as the product $kt$ increases, the advantage of the V-shape decreases, since, on average a photon travels a greater distance inside the wall material, for a V layer than for the flat sheet. Let us consider a particular example to determine whether the transmittance of the V layer is improved over that of a flat sheet cover plate. Consider, for example, a V-corrugated cover plate made of Teflon which has an index of refraction of about 1.344 an extinction coefficient of about 3.43 inch$^{-1}$ or 0.135 mm$^{-1}$ and a thickness, $t$, of 0.001 inch. Referring to FIG. 2, there is shown the predicted transmittance of such a V-shaped plate for the conditions where the V trough has an opening angle A of 45° and where energy is incident according to the angular coordinates B and C shown in FIG. 1. Also, shown is the expected curve for a flat sheet of the same material. The gain in transmittance is clearly demonstrated by these curves, although the gain in this case is not pronounced, since the index of refraction of Teflon is relatively low, giving a low reflectance. A further advantage of the V-shaped across section is that cover plate 14 will have a higher opacity to infrared radiation from surface 12 than a flat cover plate. This is because of the greater temperature gradiant across the V-cross section than a flat plate. Those peaks, 36, farther from surface 12 will appear cooler to surface 12 than a flat plate and those peaks 38, farther from plate 16 will appear cooler to plate 16 than a flat plate.

Angle A can be between 0° and 90°. It is believed that the ideal range of angles A for the V is between 30° and 60°. Above this range, the rays are not directed entirely downward. The maximum angle is 90°. Above 90° the first reflection of an incident ray will not be downwards. Below this range more material is required increasing costs. The transverse cross section distance H between peaks 36 and 38 can have any value. However, as H increases the bulk of the plate increases. As H decreases fabrication costs increase. Two and one-half inches is believed a practical upper limit on H while one-half inch is believed a practical lower limit.

The selection of a material to form the V-corrugated cover plate will generally follow the following criterion:

(1) has a low extinction coefficient and be available in thin sheets, so that $kt$ is small;
(2) has good surface finish so as not to scatter significantly the incident energy;
(3) be stable to ultraviolet to insure long life;
(4) have high temperature stability;
(5) be reasonably capable of holdings its shape; and
(6) be inexpensive.

Teflon appears to meet most of these criteria. It can be obtained in very thin widths, is easy to form into the accordion or corrugated shape, has high temperature stability in that it will not deform under the temperatures exposed to when heated by the sun. It has a low extinction coefficient and is light weight. Other examples of material which might be used are Lexan, plexiglass or Tedlar.

In FIG. 1 the corrugated plate 14 is used as an inner cover with a conventional flat cover 16 also provided as the second cover plate. This arrangement appears desirable because the corrugated shape when formed of a very thin material will not have the strength to withstand that which the outer plate will be subjected to. Therefore, a combination of these types of cover plates may prove to be most practicable. Typically the separations 20 and 22 are on the order of one-half inch. The alignment of the V-corrugated cover plate with respect to the sun is preferably such that the trough runs in the east-west direction. This is so that the angle of incidence of energy from the sun, as the sun tracks across the sky each day, remains closer to 0° with the vertical which is where the highest transmittance is obtained since the actual path through the thickness of the cover plate is the smallest. Of course, the device can be used with the V-troughs in the north-south direction; however, the angle of incidence generally has an effective value of above 0°. Glass can be used to form the V-trough but generally is not available in thin pieces, therefore tending to be very heavy and to have high absorption of incident energy. When the cover plate 14 is formed in the accordion shape of a very thin material, then the structural support for the cover plat 14 to maintain its configuration may be provided either by ribs included in the forming of the material or by providing that housing 18 includes an appropriate slotting mechanism or other means to maintain the cover plate in its shape. Materials such as heat annealed Lexan have sufficient strength to maintain their own shape.

The embodiments of the invention in which an exclusive property or privilege is claimed are defined as follows:

1. A radiant energy absorbing device, comprising: a flat energy receiver, first and second cover plates formed of a material which transmits radiant energy, said first cover plate being in a corrugated form including a plurality of adjacent V-shaped sections with each V forming an angle A, with the transverse cross section of said first cover plate being between ½ and 2½ inches and a housing with said receiver and said first and second cover plates mounted therein such that said first cover plate is positioned between said second cover plate and said receiver in parallel arrangement with a first gap between said second cover plate and said first cover plate and a second gap between said first cover plate and said receiver, A being between 30 and 60° and said gaps being on the order of one-half inch.

2. The device of claim 1 wherein said first cover plate is of a thin material and said housing is provided with a slotting mechanism which supports said first cover plate, said slotting mechanism providing the structural strength to support said first cover plate.

* * * * *